UNITED STATES PATENT OFFICE 2,725,361
Patented Nov. 29, 1955

2,725,361

QUATERNARY AMMONIUM ANION-EXCHANGE RESINS WHOSE ANION ADSORBING GROUPS CONTAIN TWO NITROGEN ATOMS

Jesse C. H. Hwa, Levittown, Pa., assignor to Rohm & Haas Company, Philadelphia, Pa., a corporation of Delaware No Drawing. Application May 20, 1954,
Serial No. 431,277

6 Claims. (Cl. 260—2.1)

This invention relates to anion-exchange resins which contain quaternary ammonium groups as their functional, anion-adsorbing groups.

The main object of this invention is to provide anion-exchange resins which have very high anion-adsorbing capacity, particularly for complex anions and anions of very high molecular weight, and which at the same time can be readily and efficiently regenerated.

This and other objects are realized by the preparation of the resins of this invention which are insoluble, cross-linked polymers of a vinyl aromatic hydrocarbon having attached to the aromatic nuclei thereof functional anion-adsorbing groups of the general formula

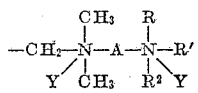

in which Y in both instances is an anion, A represents an alkylene group of two to six carbon atoms—preferably an ethylene group—or the group

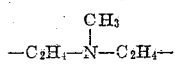

and R, R' and $R^2$ represent methyl or ethyl or β-hydroxy-ethyl radicals.

The products of this invention can be made by at least two methods. In one process, an amine having the general formula

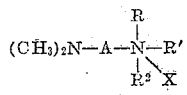

in which X is an anion and the characters A, R, R' and $R^2$ have the significance described above, is reacted with a chloromethylated, insoluble, cross-linked polymer of a monovinyl hydrocarbon, preferably styrene.

The amine, containing the quaternary ammonium group is made by quaternizing an amine such as N,N'-tetramethylethylenediamine with such agents as methyl chloride, methyl iodide, ethylene oxide, dimethyl sulfate and diethyl sulfate.

The chloromethylated resin, with which the amine is reacted to form the products of this invention, is made by the general process which is described in U. S. Patent 2,591,573. Thus, a polymer of a monovinyl hydrocarbon is prepared by emulsion or suspension polymerization in the presence of a free radical catalyst such as an organic peroxidic compound. Currently, the preferred vinyl hydrocarbon is styrene; but other compounds such as vinyl toluene, vinyl naphthalene, ethyl styrene, vinyl anthracene and the homologues of these as well as mixtures of the same may be employed.

Ordinarily a copolymerizable polyvinylidene cross-linking agent is copolymerized with the monovinyl hydrocarbon in order to insure insolubility of the resin in common organic solvents and in aqueous solutions of acids, bases and salts. Divinylbenzene is much the preferred co-polymerizable cross-linking agent since it is readily available and is a hydrocarbon which is not subject to hydrolysis. Other well-known cross-linking agents, however, which are polyvinylidene compounds because they contain two or more vinylidene groups, $CH_2=C<$, can be used, such as trivinylbenzene, divinyl toluenes, divinyl naphthalenes, divinyl ethyl benzenes, divinyl xylenes, ethylene glycol dimethacrylate, ethylene glycol diacrylate, diallyl maleate, divinyl ether, divinyl Cellosolve and the like. The amount of cross-linking agent which is employed is very important. From 0.5% to about 2% of the polyvinyl cross-linking agent, based on the total weight of the monovinyl hydrocarbon and the cross-linking agent, are employed. Actually about 1% of the cross-linking agent is the optimal amount and is therefore preferred.

In the next step, the cross-linked polymer is chloromethylated, as for example, by means of paraformaldehyde and hydrochloric acid or by means of chloromethyl methyl ether and aluminum chloride. During this chloromethylating step some cross-linking takes place which increases the complexity and reduces the solubility of the resin. It is most desirable to carry the chloromethylation as far as is reasonably possible. The extent of chloromethylation can be measured by analyzing the product for chlorine. In commercial production an effort is made to introduce an average of about one chloromethylene group, $—CH_2Cl$, for each aromatic nucleus in the resin; but resins having as few as one chloromethylene group for every two aromatic nuclei have satisfactory utility.

The reaction of the amine with the chloromethylated cross-linked polymer is preferably carried out at the highest convenient temperature while the particles of chloromethylated resin are suspended in a liquid medium such as water or an organic liquid, typified by toluene or ethylene dichloride. An aqueous medium is much preferred; and the reaction is preferably carried out at the boiling point of the reaction mixture. Best results are obtained when the particles of resin are swollen by means of an organic liquid such as ethylene dichloride prior to the amination step.

A second method of preparing the products of this invention comprises quaternizing, for example by means of methyl chloride, methyl iodide, ethylene oxide, or methyl or ethyl sulfates, an anion-exchange resin which is an insoluble, cross-linked, chloromethylated polymer of a monovinyl hydrocarbon which contains on its aromatic nuclei anion-adsorbing groups having the general formula

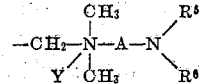

in which A and Y have the significance described above and $R^5$ and $R^6$ represent hydrogen atoms or methyl or ethyl groups. Intermediate resins of this type are the subject of another of my applications for Letters Patent, Serial No. 431,278, filed May 20, 1954. They are made by reacting an amine of the formula

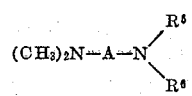

in which the characters A, $R^5$ and $R^6$ have the significance described above, with the chloromethylated cross-linked polymer whose preparation is described above. The amine,

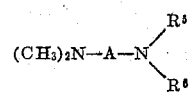

is reacted in the manner also described above in conjunction with the reaction of the amine,

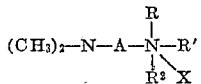

The quaternization of these intermediate resins is readily carried out. In the preferred process the particles of ion-exchange resin described above and containing the terminal amino groups

are immersed in water. While the slurry of resin is stirred, methyl chloride gas is passed into it until the adsorption of the gas ceases, preferably in the presence of a soluble iodide salt which serves as an activator. Thereafter the particles of resin are thoroughly washed. This quaternization step has been successfully carried out at room temperature and at higher temperatures. Best results were obtained when the temperature was 25° to about 95° C. and the methyl chloride was under a pressure of 5–85 p. s. i. The process has been modified to advantage by the use of lime, limestone, zinc oxide and sodium hydroxide, all of which are scavengers for HCl, and by sodium iodide which has an activating influence.

The resins as prepared by this method are obtained in the salt form; i. e., in the form where Y in the general formula above is a halogen atom or a sulfate group. Since they are ordinarily used in the hydroxyl form, they are converted to the latter form by washing with an aqueous solution of a base such as sodium hydroxide.

Methyl bromide and methyl iodide have been successfully used in the same way as the methyl chloride described above. Methyl iodide is particularly efficient but its use is hardly justified in view of its cost. Also, higher alkyl halides such as butyl chloride or butyl sulfate can be used but the disadvantage of using them is that the capacity of the resins is necessarily lowered as the size of the substituents on the nitrogen atoms increases. Methyl or ethyl sulfates have also been employed as quaternizing agents and, of course, they add methyl or ethyl groups respectively to the amino nitrogen atom. When ethylene oxide is employed, it furnishes β-hydroxyethyl groups.

Whether the first or second method described above is followed, the product is an anion-exchange resin having very high capacity by virtue of the presence of the bis-quaternary ammonium functional groups

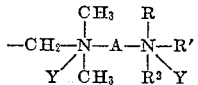

on the aromatic nuclei of the insoluble, cross-linked resin. The resins which are the most satisfactory are those in which all of the alkyl substituents on the two nitrogen atoms are methyl groups and the alkylene group between the nitrogen atoms is an ethylene group.

The following examples serve to illustrate further the preparation of the products of this invention:

*Example 1*

Into a reactor equipped with thermometer, mechanical agitator and reflux condenser was charged 4000 ml. of water and 340 ml. of a 1.5% aqueous solution of magnesium silicate. Agitation was started and a mixture of 975 grams of styrene and 25 grams of commercial divinylbenzene (containing 10 grams of divinylbenzene and 15 grams of ethyl styrene) and 10 grams of benzoyl peroxide was added to the contents of the flask. The stirred mixture was heated to refluxing temperature and held there for approximately three hours. The cooled mixture was then filtered and the resinous spheroids were dried.

The dried product was next chloromethylated in a reactor equipped with thermometer, stirrer and reflux condenser. Thus, 2000 grams of chloromethyl methyl ether, $CH_3OCH_2Cl$, was added to the resin and the mixture was allowed to stand at room temperature for a half-hour during which time the particles of resin became swollen. To the mixture was added 2300 ml. of petroleum ether (B. P. 30°–60° C.); and agitation was begun. The mixture was cooled to 0° C. and 600 grams of anhydrous aluminum chloride was slowly added over a period of about an hour. Stirring was continued for two hours while the mixture was maintained at 0° C. Then 10 liters of ice-water was slowly added and stirring was continued for a half-hour. The beads of resin were filtered off. The chloromethylated product contained 18.9% chlorine.

The beads of resin were covered with ethylene dichloride and thus swollen. They then contained 49.5% solids, the remainder being water and ethylene dichloride. A mixture of 700 grams of the moist resin, 800 ml. of water and 225 grams of N,N'-tetramethylethylenediamine, $(CH_3)_2NC_2H_4N(CH_3)_2$, was charged to a reactor equipped with thermometer, stirrer and reflux condenser. Stirring and heating were begun and the mixture was taken to refluxing temperature and held there for two hours. Next, 500 ml. of water was added and the condenser was set for downward distillation. Distillation was continued until no ethylene dichloride appeared in the distillate. Meanwhile water was added to replace that removed by distillation. After cooling to room temperature the resin, still in the form of spheroids, was thoroughly washed with water to neutrality. It contained as substituents on the aromatic nuclei groups having the formula

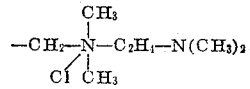

The product was an ion-exchange resin having a total base capacity of 5.24 milliequivalents (meq.) per gram (dry basis) or 1.93 meq./ml. wet. Its quaternary ammonium capacity was 2.84 meq./g. dry and 1.04 meq./ml. wet. The quaternary ammonium capacity is a measure of the ability of the resin to split neutral salts such as sodium chloride and to exchange its anions for the anions of the salt, while the total base capacity is a measure of the ability of the resin to remove acids from solution by adsorption on the weakly basic amino groups (in this case, the terminal—$N(CH_3)_2$ groups) and by ion-exchange on the quaternary ammonium groups.

One hundred grams of the moist resin (50.7% solids) and 100 ml. of water were charged to a container equipped with stirrer, gas-inlet tube, thermometer and a mercury manometer. Air was swept out of the container by a stream of methyl chloride, after which the system was sealed, stirring was started and methyl chloride was passed in at a sustained pressure of 30 cm. Hg. The reaction mixture was gradually heated to 45° C. and was maintained at that point under pressure for four hours. The reactor and contents were cooled to room temperature and the resin was separated and washed and then converted to the hydroxyl form by washing with a 5% solution of sodium hydroxide.

The product had a total base capacity of 4.87 meq./g. dry or 1.83 meq./ml. wet. Its quaternary capacity was 3.45 meq./g. dry or 130 meq./ml. wet. Thus the ratio of quaternary capacity to total base capacity is 71:100.

*Example 2*

Into a reactor equipped with thermometer, agitator and reflux condenser was charged a mixture of 50 grams of technical 2-dimethylaminoethyltrimethylammonium iodide, $(CH_3)_2—N—C_2H_4—N(CH_3)_3I$, 80 ml. of water and 66 grams of the chloromethylated beads of resin prepared in the process of Example 1 above. The beads of resin were swollen with ethylene dichloride, moistened with water, and contained 46.5% resin solids. The mixture was heated at refluxing temperature for 8 hours. Otherwise the amination process was the same as that described in Example 1 above. The product was washed first with a 10% solution of hydrochloric acid and then thoroughly with water. A yield of 122 grams of moist resin (48.5% resin solids) was obtained which had a density of 45.2 lbs./cu. ft. The total base capacities of the resin were 4.74 meq./g. dry and 1.67 meq./ml. wet. Its quaternary ammonium capacities were 3.96 meq./g. dry and 1.39 meq./ml. wet.

This resin, like all the products of this invention, is readily converted from the salt form to the hydroxyl form by treatment with a solution of a base such as sodium hydroxide.

In the above description of the resins of this invention, the character Y has been used to represent an anion. The resins are normally prepared in the chloride form, in which case Y is a chloride group. They are, however, readily converted to other salt forms by treatment with other mineral acids, such as sulfuric acids, or with inorganic salts such as sodium, potassium or ammonium sulfates, in which cases Y represents the anion of the acid or salt employed.

I claim:

1. A strongly basic bis-quaternary ammonium anion-exchange resin which comprises an insoluble, cross-linked copolymer of 98–99.5% of a monovinyl hydrocarbon and 0.5–2% of a polyvinylidene compound, said copolymer containing on the aromatic nuclei substituent groups having the general formula

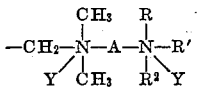

in which Y in both instances is an anion, A represents a member of the class consisting of the radical

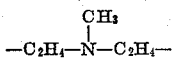

and divalent alkylene radicals of 2 to 6 carbon atoms, and R, R' and R² represent members of the class consisting of methyl, ethyl and β-hydroxyethyl radicals, the number of said groups being from 5 to 10 for every 10 aromatic nuclei.

2. The product of claim 1 in which said polyvinylidene compound is divinylbenzene.

3. A strongly basic bis-quaternary ammonium anion-exchange resin which comprises an insoluble cross-linked copolymer of 98–99.5% of a monovinyl hydrocarbon and 0.5–2% of a polyvinylidene compound, said copolymer containing on the aromatic nuclei substituent groups having the formula

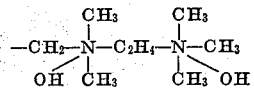

the number of said groups being from 5 to 10 for every 10 aromatic nuclei.

4. A strongly basic bis-quaternary ammonium anion-exchange resin which comprises an insoluble cross-linked copolymer of about 99% of a monovinyl hydrocarbon and about 1% of a polyvinylidene compound, said copolymer containing on the aromatic nuclei substituent groups having the formula

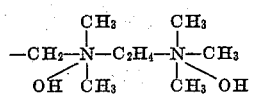

the number of said groups being from 5 to 10 for every 10 aromatic nuclei.

5. A strongly basic bis-quaternary ammonium anion-exchange resin which comprises an insoluble cross-linked copolymer of about 99% styrene and about 1% of a polyvinylidene compound, said copolymer containing on the aromatic nuclei substituent groups having the formula

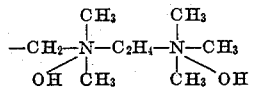

the number of said groups being from 5 to 10 for every 10 aromatic nuclei.

6. The product of claim 5 in which said polyvinylidene compound is divinylbenzene.

References Cited in the file of this patent

UNITED STATES PATENTS

| | | |
|---|---|---|
| 2,591,573 | McBurney | Apr. 1, 1952 |
| 2,630,427 | Hwa | Mar. 3, 1953 |
| 2,675,359 | Schneider | Apr. 13, 1954 |
| 2,683,125 | D'Alelio | July 6, 1954 |